United States Patent [19]

Yamazaki

[11] 4,285,582

[45] Aug. 25, 1981

[54] LIGHT MEASURING APPARATUS

[75] Inventor: Masaru Yamazaki, Tokyo, Japan

[73] Assignee: Copal Company Limited, Tokyo, Japan

[21] Appl. No.: 2,764

[22] Filed: Jan. 11, 1979

Related U.S. Application Data

[63] Continuation-in-part of Ser. No. 816,711, Jul. 18, 1977, abandoned.

[30] Foreign Application Priority Data

| Jul. 22, 1976 | [JP] | Japan | 51-86611 |
| Jul. 29, 1976 | [JP] | Japan | 51-89722 |
| Jul. 29, 1976 | [JP] | Japan | 51-89723 |

[51] Int. Cl.³ .............................................. G03B 7/08
[52] U.S. Cl. .................................... 354/23 D; 354/51
[58] Field of Search ............... 354/23 D, 50, 51, 60 R

[56] References Cited

U.S. PATENT DOCUMENTS

| 3,868,704 | 2/1975 | Yamada | 354/50 |
| 3,962,708 | 6/1976 | Muramatsu | 354/51 |
| 3,974,509 | 8/1976 | Tsuda et al. | 354/51 |
| 4,132,985 | 1/1979 | Kitaura | 354/23 D |
| 4,156,562 | 5/1979 | Kawasaki et al. | 354/23 D |

FOREIGN PATENT DOCUMENTS 1677476 5/1976 Japan.

Primary Examiner—L. T. Hix
Assistant Examiner—S. D. Schreyer
Attorney, Agent, or Firm—Oblon, Fisher, Spivak, McClelland & Maier

[57] ABSTRACT

A light measuring apparatus comprising a photoelectric element exposed to incident light and coupled to a plurality of parallel-connected capacitors which integrate the photoelectric current output from the element. Control means successively switch each of the capacitors in parallel as the photoelectric current charges a first previously switched capacitors in accordance with the voltage integrated on the capacitors as sensed by a comparator. After a predetermined time, the parallel charged capacitors are discharged through a constant current source, with the discharge time being digitally monitored to produce a digital output proportional to the incident light level.

8 Claims, 8 Drawing Figures

LIGHT MEASURING APPARATUS

CROSS-REFERENCE TO RELATED APPLICATIONS

This application is a continuation-in-part of application Ser. No. 816,711, filed on July 18, 1977, abandoned.

BACKGROUND OF THE INVENTION

The present invention relates to a light measuring system useful in determining the proper exposure in a photographic device such as a camera, a printer of photographic papers and the like or useful in measuring the average intensity of light incident to a device in which the light is utilized for the operation thereof.

Heretofore, a number of light measuring systems have been developed. However, almost all such systems incorporate analogue circuits therein so that the accuracy in the measurement of light, the range of the measurement of various intensity of the light, the capability of adjustment in various operations of the device and operational functions are insufficient and render the constructions to be complicated and expensive when the performance of the device is to be improved.

Further, in the prior art light measuring system, a single capacitor is usually used for charging or discharging the electric charge charged therein by a current from a photoelectric element which receives the light so as to generate the current indicative of the intensity thereof in order to measure the intensity of the light. In such a system, the accuracy of the measurement is deteriorated if the intensity of the light is low with respect to the capacity of the capacitor, while the accurate measurement of a high intensity of the light is made impossible if a capacitor used is of a small capacity because of the saturation of the charged voltage.

In order to broaden the range of measurement of the light having widely variable intensity, methods for performing logarithmic compression and expansion of the intensity of light have also been proposed. However, such logarithmic compression and expansion methods for measuring the intensity of light have led to deterioration in the accuracy of the measurement.

The present invention aims at avoiding the above described disadvantages of the prior art light measuring systems.

SUMMARY OF THE INVENTION

An object of the present invention is to provide a novel and useful light measuring system which avoids the above described disadvantages of the prior art system and is capable of measuring the light in terms of a digitally indicated time value which can be used in a photographic device such as a camera, a printer of photographic papers and the like for the proper operation, control and indication thereof.

Another object is to provide a novel and useful light measuring system of the type described above which is adapted to measure instantaneous light emission issued by a flash lamp device, an electronic flashing device and the like.

According to the characteristic feature of the present invention, a novel light measuring system for measuring the intensity of light which is characterized by integrating for a predetermined time period the photoelectric current generated in a photoelectric element by the light incident thereto by the medium of capacitor means so as to determine the variation in the electric charge in the capacitor means which is proportional to the total quantity of the light incident to the photoelectric element for the predetermined time period, discharging/charging the electric charge of the capacitor means through a constant current circuit so as to vary the voltage thereof, and measuring in terms of a digital value the time period required for rendering the thus varied voltage of the capacitor means to be equal to a predetermined voltage by the discharging/charging thereof, thereby permitting the intensity of the light to be converted into said time period indicated in terms of the digital value.

The capacitor means may be discharged during the measuring through a constant current circuit or may be charged by a constant current electric source for achieving the same measured result.

In accordance with the present invention, the capacitor means may comprise a plurality of parallel connectable capacitors adapted to be successively connected in parallel to the previously connected capacitor, and shift register means is connected to each capacitor while comparator means is connected between the shift register means and the capacitors thereby permitting the respective succeeding capacitor to be connected additionally in parallel to the previously connected capacitor by the actuation of the shift register means actuated by the comparator means each time the voltage of the respective previously parallel connected capacitor reaches a predetermined voltage as set by the comparator means.

Further, the light measuring system may be combined with a photographic device such as a camera and a printer of photosensitive papers, wherein the light measuring system further comprises introducing at least an exposure factor such as the film sensitivity, the shutter speed and the diaphragm aperture of an objective lens of the photographic device to the digitally indicated time value by the medium of an operation circuit so as to modify the same depending upon the exposure factor, and which exhibits informations thus obtained from the proper exposure by the medium of an indicating means.

The light measuring system of the present invention greatly facilitates the proper operation of the photographic devices which require an accurate result of measurement of the intensity of light.

DETAILED DESCRIPTION OF THE PREFERRED EMBODIMENTS

Figure 1:
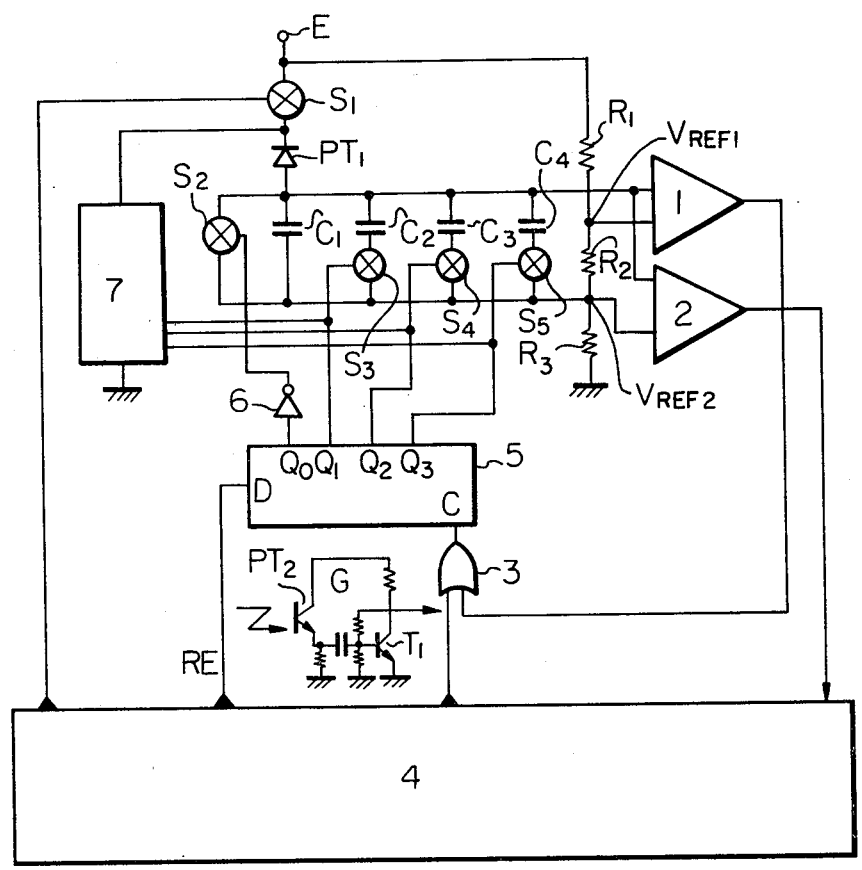
FIG. 1 is a block diagram showing an embodiment of the electric circuit embodying the light measuring system of the present invention.

Referring to FIG. 1, one terminal of an electric source E is connected to one terminal of a capacitor $C_1$ through a series circuit consisting of an analog switch $S_1$ and a junction type photoelectric element $PT_1$ such as a silicon photodiode, the other terminal of the capacitor $C_1$ being connected to the junction between a resistor $R_2$ and a resistor $R_3$ which form together with a resistor $R_1$ a series circuit connected between the above described one terminal of the electric source E and the other terminal thereof, i.e., the grounded terminal. An analog switch $S_2$ is connected in parallel to the capacitor $C_1$ while a series circuit consisting of a capacitor $C_2$ and an analog switch $S_3$ is connected in parallel to the capacitor $C_1$. In the similar manner, a plurality of series circuit each consisting of a capacitor $C_3$ and an analog switch $S_4$, a capacitor $C_4$ and an analog switch $S_5$,—are connected in parallel to the capacitor $C_1$.

The series circuit consisting of the resistors $R_1$, $R_2$ and $R_3$ defines the reference voltages $V_{REF1}$ and $V_{REF2}$ at the junctions between the resistors $R_1$ and $R_2$ and the resistors $R_2$ and $R_3$, respectively.

The reference voltage $V_{REF1}$ is supplied to one input terminal of a comparator 1 while the reference voltage $V_{REF2}$ is supplied to one input terminal of a comparator 2. The other input terminal of the comparator 1 is connected to the one terminal of the capacitor $C_1$ which is connected to the photoelectric element $PT_1$.

The other input terminal of the comparator 2 is also connected to the one terminal of the capacitor $C_1$ which is connected to the photoelectric element $PT_1$.

The output terminal of the comparator 1 is connected to one input terminal of an OR circuit 3, while the output terminal of the comparator 2 is connected to the input terminal $I_RQ$ of a time measuring counter in a control circuit broadly designated by the reference numeral 4.

Figure 8:
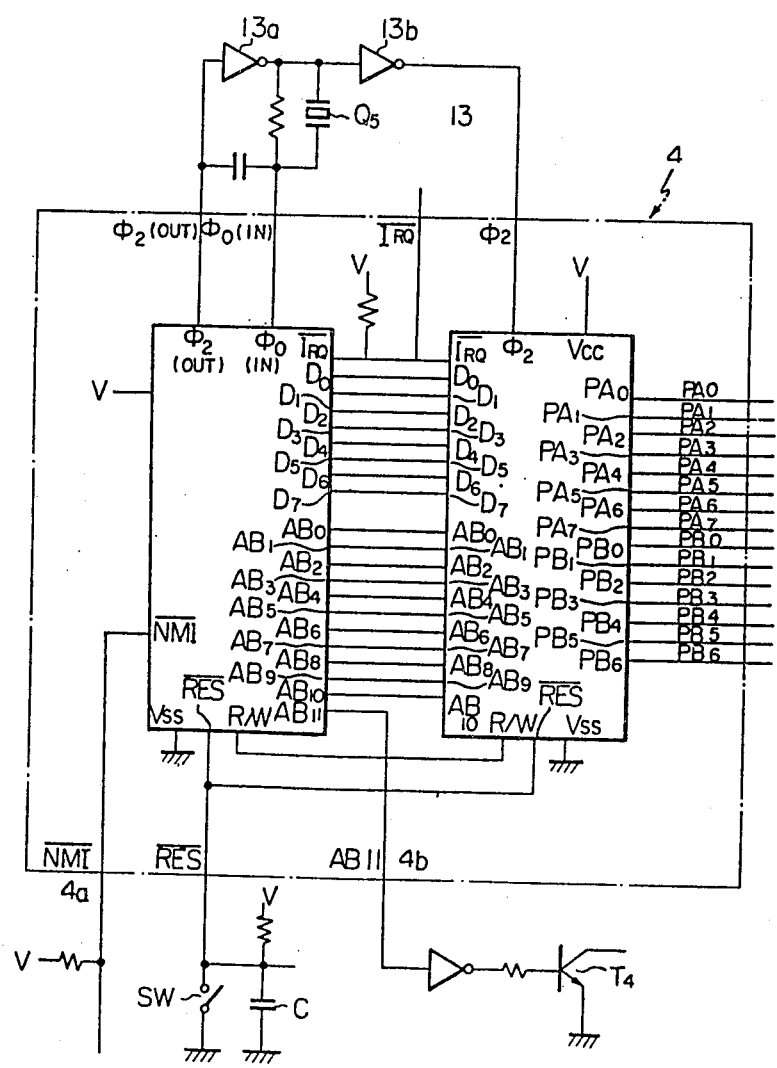
FIG. 8 shows an example of a microprocessor system usable as the control circuit 4 shown in FIGS. 1, 2 and 6.

The control circuit 4 is a microprocessor system as shown in FIG. 8. In this example, the control circuit 4 is constructed by two chips of LSIs comprising MCS 6503 CPU LSI and LSI including MCS 6530 ROM, RAM, I/O TIMER produced by MOS TECHNOLOGY, INC., but which may be replaced by those analogous thereto produced by some other makers. However, a similar control program may be also made by other systems than the above microprocessor system.

The gates of the analog switches $S_3$, $S_4$, $S_5$ - - - are connected to the respective shift output terminals $Q_1$, $Q_2$, $Q_3$ - - - of a shift register 5, while the gate of the analog switch $S_2$ is connected through an inverter circuit 6 to the output terminal $Q_o$ of the shift register 5.

The gate of the analog switch $S_1$ is connected to the output $PA_7$ of a light measurement command circuit of the control circuit 4.

The reset terminal D of the shift register 5 is connected to the reset command terminal RE of the control cirduit 4, and the other input terminal of the OR circuit 3 is connected to an output terminal of the control circuit 4, the output terminal of the OR circuit 3 being connected to the shift input terminal C of the shift register 5.

The junction between the analog switch $S_1$ and the cathode of the photoelectric element $PT_1$ is grounded through a constant current circuit 7 which is determined to flow therethrough a current of a fixed value or a variably settable value.

The operation of the above described system of the present invention is as follows.

The reset command RE is first applied to the reset input D of the shift register 5 so that the output $Q_o$ is reset to a low level so as to apply a high level signal to the gate of the switch $S_2$ through inverter circuit 6, and the outputs $Q_1$, $Q_2$, $Q_3$, - - - are reset rendered to high levels, respectively, so as to apply high level signals to the gates of the respective switches $S_3$, $S_4$, $S_5$ - - - , so that the current of the constant current circuit 7 flows from the electric source E through the switch $S_1$, and the analog switches $S_2$, $S_3$, $S_4$, $S_5$ - - - are made conductive thereby discharging all the residual charges in the capacitors $C_1$, $C_2$, $C_3$, $C_4$ - - - . Upon issuance of the succeeding command from the control circuit 4, the switches $S_2$, $S_3$, $S_4$, $S_5$ - - - are made non-conductive so as to be ready for the light measuring operation. At this time, the constant current circuit 7 forms a current passage in which the current flows through the photoelectric element $PT_1$ in the forward direction, because the switch $S_1$ is in the OFF condition. Further, at this time, since the switch $S_2$ is in the ON condition, the electric charge in the capacitor $C_1$ will not vary even though a current flows through the photoelectric element $PT_1$.

Upon issuance of the succeeding command from the control circuit 4, the analog switch $S_1$ is rendered conductive so that the photoelectric current generated in the photoelectric element $PT_1$ by the light incident thereto is first applied to the capacitor $C_1$, because the switches $S_2$, $S_3$ - - - are non-conductive When the voltage of the charge stored in the capacitor $C_1$ reaches the reference voltage $V_{REF1}$, the output of the comparator 1 is made high level which is applied to the OR circuit 3 so that the output of the OR circuit 3 is also made high level. The high level output of the OR circuit 3 is supplied to the shift input terminal C of the shift register 5 thereby rendering the output $Q_1$ high level so as to render the analog switch $S_3$ conductive. Thus, the capacitor $C_2$ is connected in parallel to the capacitor $C_1$ to increase the total capacity of the integrating capacitor means now consisting of the capacitors $C_1$ and $C_2$, thereby lowering the voltage at that terminal of the capacitor $C_1$ connected to the photoelectric element $PT_1$ so that the output of the comparator 1 is again made low level to continue the charging of both the capacitors $C_1$ and $C_2$. In the similar manner, the capacitors $C_3$, $C_4$ - - - are successively connected in parallel to the capacitor $C_1$ by virtue of the respective shift outputs $Q_2$, $Q_3$, - - - being rendered successively high level each time the voltage at the junction between the capacitor $C_1$ and the photoelectric element $PT_1$ reaches the reference voltage $V_{REF1}$.

An integration terminating signal or a light measuring terminating signal is then issued from the control circuit 4 at a predetermined time which can be a fixed time or a variably settable time, and the analog switch $S_1$ is rendered non-conductive to stop the charging of the capacitors $C_1$, $C_2$, $C_3$, - - - by the photoelectric current generated in the photoelectric element $PT_1$.

When the switch $S_1$ is switched to the OFF condition, the current of the constant current circuit 7 which has been flowing through the switch $S_1$ begins to flow through the photoelectric element $PT_1$, thereby discharging the electric charges stored in the capacitor $C_1$ and the capacitors $C_2$, $C_3$ - - - connected in parallel to the capacitor $C_1$. In this case, the constant current circuit 7 may be a variable constant current circuit controlled by logic inputs $I_0$-$I_2$ as shown in FIG. 1 or may be a fixed constant current source such as the constant current circuit 8 shown in FIG. 8. At the same time as the starting of the discharging of the capacitors $C_1$, $C_2$, $C_3$, - - - , the time measuring counter of the control circuit 4 which is controlled by the output of the comparator 2 begins its counting operation for the time measurement.

When the terminal voltage of the capacitors $C_1$, $C_2$, $C_3$, - - -, applied to one input terminal of the comparator 2 is lowered equal to the reference voltage $V_{REF2}$ applied to the other input terminal of the comparator 2 as the discharging proceeds, then the output of the comparator 2 changes to the high level so as to terminate the counting operation of the time measuring counter in the control circuit 4, thereby permitting the time period from the starting of the discharge of the capacitors $C_1$, $C_2$, $C_3$, - - - to the termination of the discharge in terms of number of pulses counted in the time measuring counter, i.e., in terms of a digital value. Since the discharging of the capacitors $C_1$, $C_2$, $C_3$, - - - is effected through the constant current circuit 7 which passes a constant current of fixed value or of an adjustably set value, the discharging time as measured by the time measuring counter in the control circuit 4 is proportional to the amount of the charge which has been stored in the capacitors $C_1$, $C_2$, $C_3$, - - - during the above described predetermined time period.

Since the measurement of the time is digitally effected, a digital value is obtained by the measurement, which is proportional to the quantity of light incident to the photoelectric element $PT_1$ during the above described predetermined time period.

The average intensity of the light is readily obtained by dividing the thusly obtained digital value by the above described time period.

In the above described circuit, an external artificial light such as issued by a flash lamp and an electronic flash device can also be measured in accordance with the present invention by providing a photo-triggering circuit G as shown in FIG. 1.

The photo-triggering circuit G shown in FIG. 1 includes a phototransistor $PT_2$ adapted to receive external light issued by an external artificial light source such as a flash lamp or an electronic flash device so as to amplify the current flowing therethrough to trigger the circuit G, a transistor $T_1$ and resistors connected as shown, and the output of the circuit G is adapted to be connected to the shift input C of the shift register 5.

Thus, when the external light source issues an instantaneous light and the phototransistor $PT_2$ receives the light, the photo-triggering circuit G is triggered to apply a signal to the shift input C of the shift register 5, thereby permitting the light issued by the external artificial light source to be simultaneously measured together with the scene light.

Figure 2:
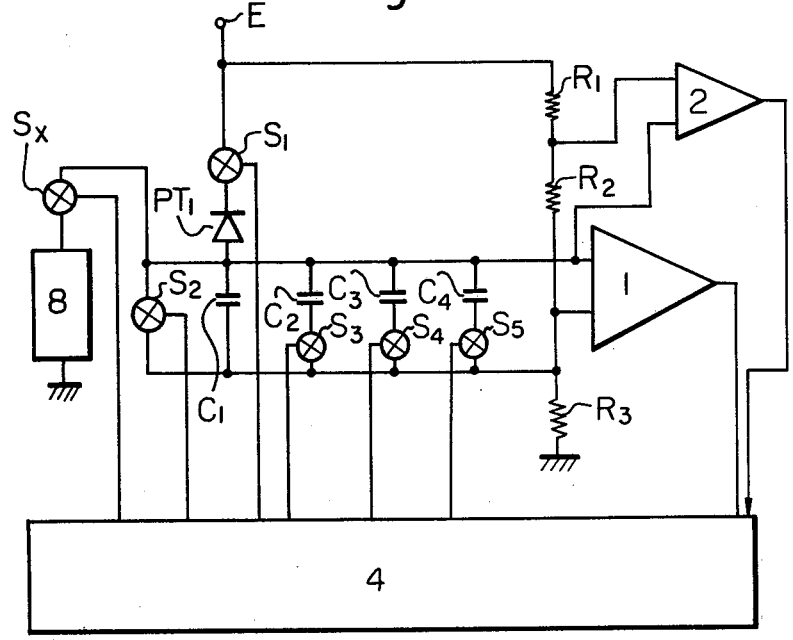
FIG. 2 is a block diagram similar to FIG. 1 but showing another embodiment of the present invention.

FIG. 2 shows another embodiment of the present invention. The circuit shown in FIG. 2 is substantially similar to that shown in FIG. 1 except that a constant current electric source 8 is adapted to supply a constant current to the capacitors $C_1$, $C_2$, $C_3$, - - - and an analog switch $S_x$ is connected between the constant current electric source 8 and the one terminal of the capacitor $C_1$ to which the photoelectric element $PT_1$ is connected, the gate of the switch $S_x$ being connected to the control circuit 4 so that the switch $S_x$ is controlled thereby.

The circuit shown in FIG. 2 is operated in a similar manner as that shown in FIG. 1.

In the above described embodiments, the capacitors $C_1$, $C_2$, $C_3$, - - - are charged during the integrating step and the stored charge is discharged during the light measuring step. However, the capacitors $C_1$, $C_2$, $C_3$, - - - may be discharged during the integrating step while the capacitors $C_1$, $C_2$, $C_3$, - - - are charged during the light measuring step for the measurement of the light quantity received by the photoelectric element $PT_1$. To this end, the polarity of each of the electric source E, the photoelectric element $PT_1$ and the constant current circuit 7 or 8 is reversed, while the electric source is connected in series with the analog switch.

Figure 3:
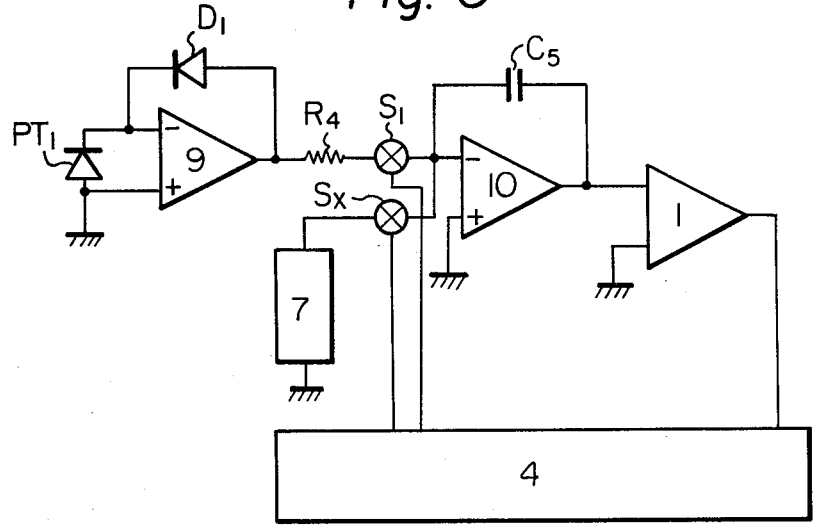
FIG. 3 is a block diagram similar to FIG. 1 but showing a still further embodiment of the present invention.
Figure 6:
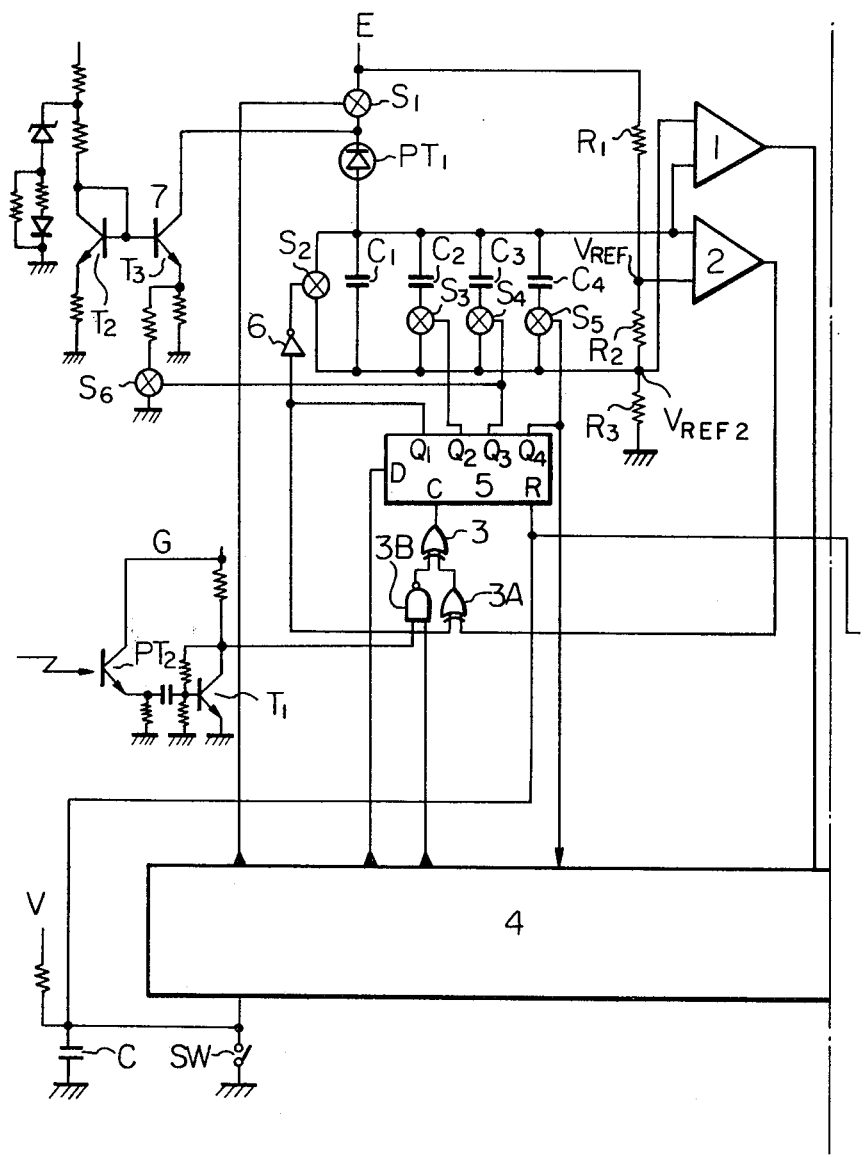
FIG. 6 is a block diagram showing the left-hand half of the electric circuit of the present invention.

FIG. 3 shows a specific circuit construction of the constant current circuit 7. The constant current circuit 7 of FIG. 1, the constant current circuit 8 and the constant current circuit 7 of FIG. 6 may comprise basically the circuit construction shown in FIG. 3. The constant current circuit 7 in FIG. 1 is substantially similar to that shown in FIG. 3, while the constant current circuit 8 in FIG. 2 is the one shown in FIG. 2 from which, however, the resistors $R_{70}$-$R_{72}$ and the switches $S_6$, $S'_6$, $S''_6$ are omitted. Further, the constant current circuit 7 in FIG. 6 is the one shown in FIG. 3 from which, however, the resistors $R_{71}$, $R_{72}$ and the switches $S'_6$, $S''_6$ are omitted. The constant current circuit 7 of FIG. 3 acts as a variable constant current circuit so as to control the collector current of the transistor $T_3$ by logic inputs $I_0$-$I_2$. The output current is determined by the emitter current of the transistor $T_2$ and the ratio of the emitter resistance $R_{74}$ with respect to the resultant emitter resistance ($R_{70}$-$R_{72}$) of the transistor $T_3$. In this constant current circuit 7, the emitter current of the transistor $T_2$ is equal to the value obtained from the voltage of the constant voltage circuit constructed by the Zener diode ZD, the diode D and the resistors $R_{77}$, $R_{78}$ from which the base emitter voltage of the transistor $T_2$ is subtracted and, thereafter, divided by the resultant resistance value of the resistors $R_{74}+R_{75}$. The resistors $R_{77}$, $R_{78}$ and the diode D provided in the Zener constant voltage circuit are for the temperature compensation for the emitter current of the transistor $T_2$.

In accordance with the present invention, since the measurement of the light is obtained in terms of a digital value which can be treated digitally for the succeeding operations for the desired purposes, there is no deficiency in the deterioration of circuit SN while the construction of the circuit is made simple.

Figure 4:
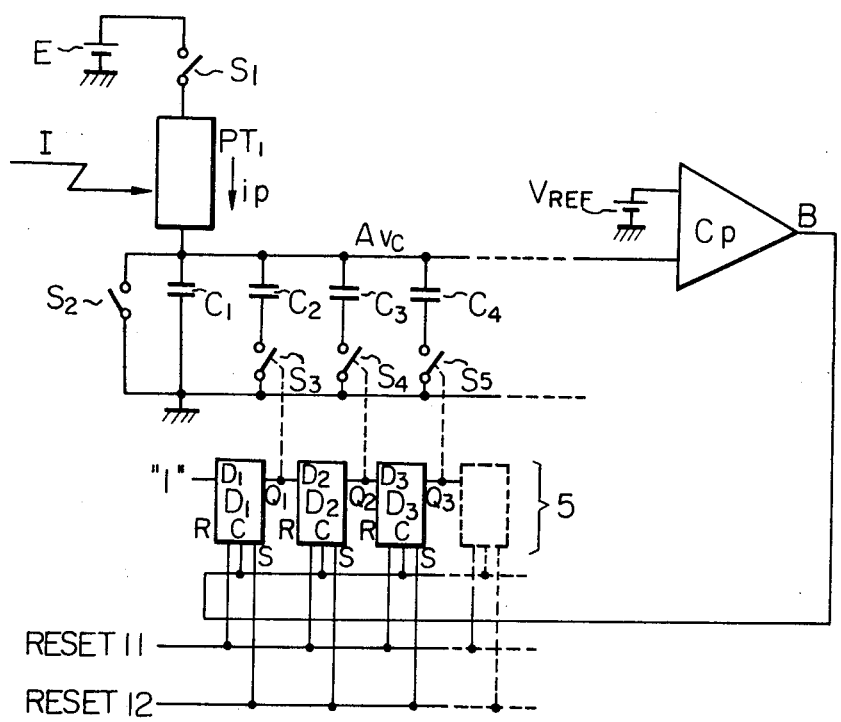
FIG. 4 is a diagram similar to FIG. 1 but showing another embodiment of the present invention.

FIG. 4 is a view for expanding in detail the operation of the present invention without the control circuit 4. Therefore, in the drawing, a simplified showing is given in order to make the understanding of the operation easy in comparison with other drawings in which a complicated construction is shown for effecting the same operation. In order to render all the outputs to be high levels in FIG. 4, for example, it suffices to merely apply to the RESET 11 a high level signal. However, in order to obtain the same effect in FIG. 6, the input to the terminal D of the shift register 5 must be rendered to be high, while the necessary number of clock pulses are input to the terminal C.

The circuit of FIG. 4 is generally similar to that of FIG. 1 except that the shift inputs for the shift register 5 formed of flip flops $D_1$, $D_2$, $D_3$, - - - are applied to the respective shift input terminals C thereof from the output B of a comparator $C_p$, the respective inputs of which are connected to one terminal of the capacitor $C_1$ to which the photoelectric element $PT_1$ is connected and a reference voltage source $V_{REF}$, while the control circuit 4 of FIG. 1 is replaced by reset signal sources 11 and 12.

The set input terminal S of each flip flop $D_1$, $D_2$, $D_3$, - - - is connected to a reset signal source 11, while the reset input terminal R of each flip flop $D_1$, $D_2$, $D_3$, - - - is connected to a reset signal source 12. The switches $S_1$ and $S_2$ may be analog switches as in the case of FIG. 1, while the switches $S_3$, $S_4$, - - - are rendered conductive when the respective shift output terminals $Q_1$, $Q_2$, $Q_3$, - - - are rendered high level by the input applied to the shift input terminal C of the respective flip flop.

When high level reset inputs are applied from the reset signal source 11 to the set input terminals S of the respective flip flops $D_1$, $D_2$, $D_3$, - - -, the outputs $Q_1$, $Q_2$, $Q_3$, - - - are rendered high level so as to render the switches $S_3$, $S_4$, $S_5$, - - - conductive, whereas the respective switches $S_3$, $S_4$, $S_5$, - - - are rendered non-conductive when high level reset signals from the reset signal source 12 are applied to the reset input terminals R of the respective flip flops $D_1$, $D_2$, $D_3$, - - - .

Figure 5:
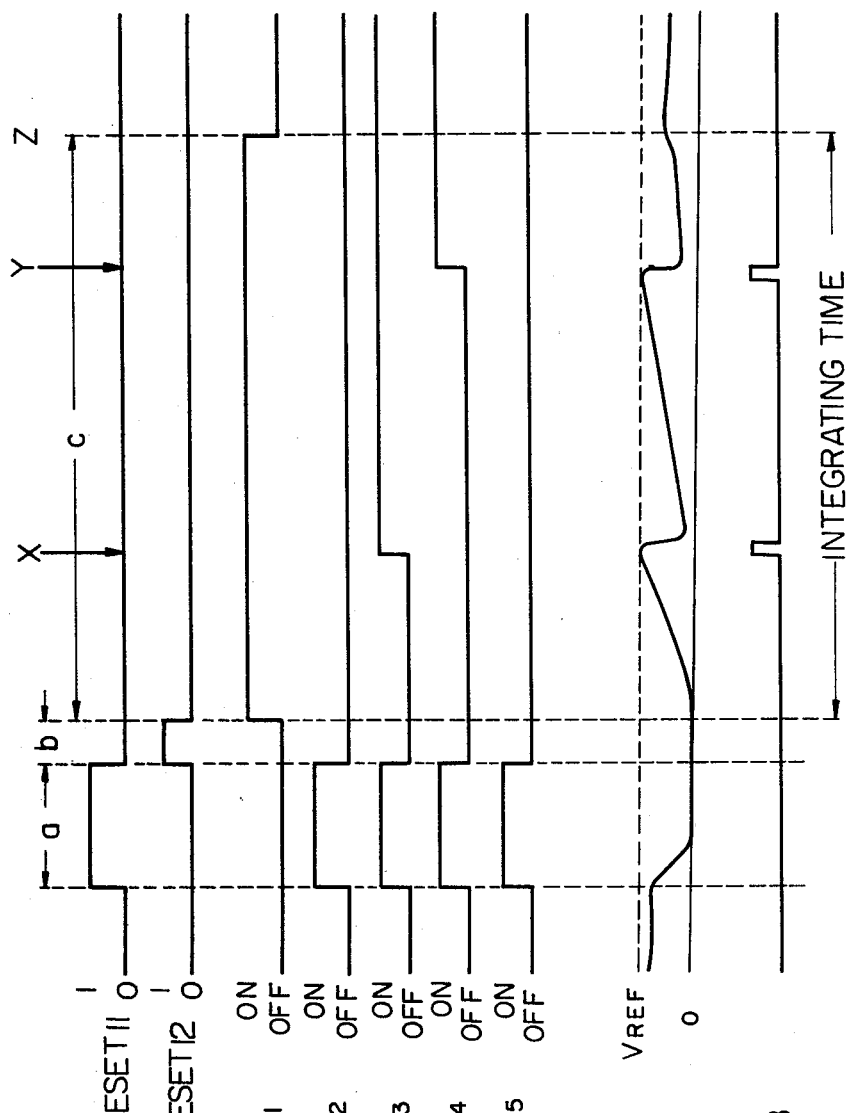
FIG. 5 is a time chart showing the operations of various components of the embodiment of FIG. 4.

The operation of the circuit shown in FIG. 4 is similar to that of FIG. 1. In the ready for operation step as shown in FIG. 5, the switch $S_2$ is switched to the conductive state so that all the residual charge in the capacitors $C_1$, $C_2$, $C_3$, - - - is discharged so as to apply ground potential to the junction A. In this case, the high level reset signals from the reset signal source 11 are applied to the respective flip flops $D_1$, $D_2$, $D_3$, - - - so that the shift outputs $Q_1$, $Q_2$, $Q_3$, - - - are made high level so as to render the respective switches $S_3$, $S_4$, $S_5$, - - - conductive thereby permitting the capacitors $C_2$, $C_3$, $C_4$, - - - to be discharged.

In the next step b, the reset signal source 12 is rendered to be high level so as to render the respective switches $S_2$, $S_3$, $S_4$, - - - non-conductive thereby completing the steps necessary to make the system ready for measurement of light.

In order to commence the light measurement, the switch $S_1$ is rendered conductive (see FIG. 5). Thus, the light measuring step C (FIG. 5) is commenced. In this step, the capacitor $C_1$ is first charged by the photoelectric current ip generated in the photoelectric element $PT_1$ by the light I incident thereto so that the voltage at A is raised at a rate corresponding to the intensity of the light I. When the voltage at A reaches the reference voltage $V_{REF}$ (shown by x in FIG. 5), then the output B of the comparator $C_p$ is made high level and the shift input terminal C of the shift register 5 is changed to the high level so that the output $Q_1$ of the flip flop $D_1$ is changed to the high level thereby rendering the switch $S_3$ conductive to connect the capacitor $C_2$ in parallel to the capacitor $C_1$. Thus, the total capacity of the integrating capacitor means is increased to $C_1+C_2$ (assuming that the capacity of each capacitor $C_1$, $C_2$, is $C_1$ and $C_2$), and the voltage vc at the junction A is lowered to $$vc = \frac{C_1}{C_1 + C_2} V_{REF}$$

rendering the output B of the comparator $C_p$ low level so that the charging of the capacitors $C_1$, $C_2$ by the photoelectric current ip is continued to gradually raise the voltage at A. When the voltage at A reaches the reference voltage $V_{REF}$, the comparator $C_p$ is switched to issue a high level output so that the output $Q_2$ is made high level to connect the capacitor $C_3$ in parallel to the capacitor $C_1$ through the switch $S_4$ which is rendered conductive by the high level output from $Q_2$. This procedure is repeated until the predetermined time period T lapses at which time the switch $S_1$ is rendered non-conductive at the time Z so that the light measurement or the integration of the photoelectric current ip is stopped.

The integrated value of the photoelectric current ip, i.e., the electric charge q stored in the capacitors $C_1$, $C_2$, $C_3$, - - - is $$q = \int_o^T ip\, dt$$

where t = time.

This value q is solely determined by the above equation regardless of the voltage at A and the number of capacitors used for the integration of the photoelectric current ip.

Since q=0 at t=0, the average intensity of the incident light I is determined by q/T where the integrating time T is arbitrarily settable.

By selecting the reference voltage $V_{REF}$ appropriately, the operation of the circuit can be carried out below the saturation voltage of each capacitor so that sufficient accuracy in operation is insured in the wide range of the measurement.

Figure 7:
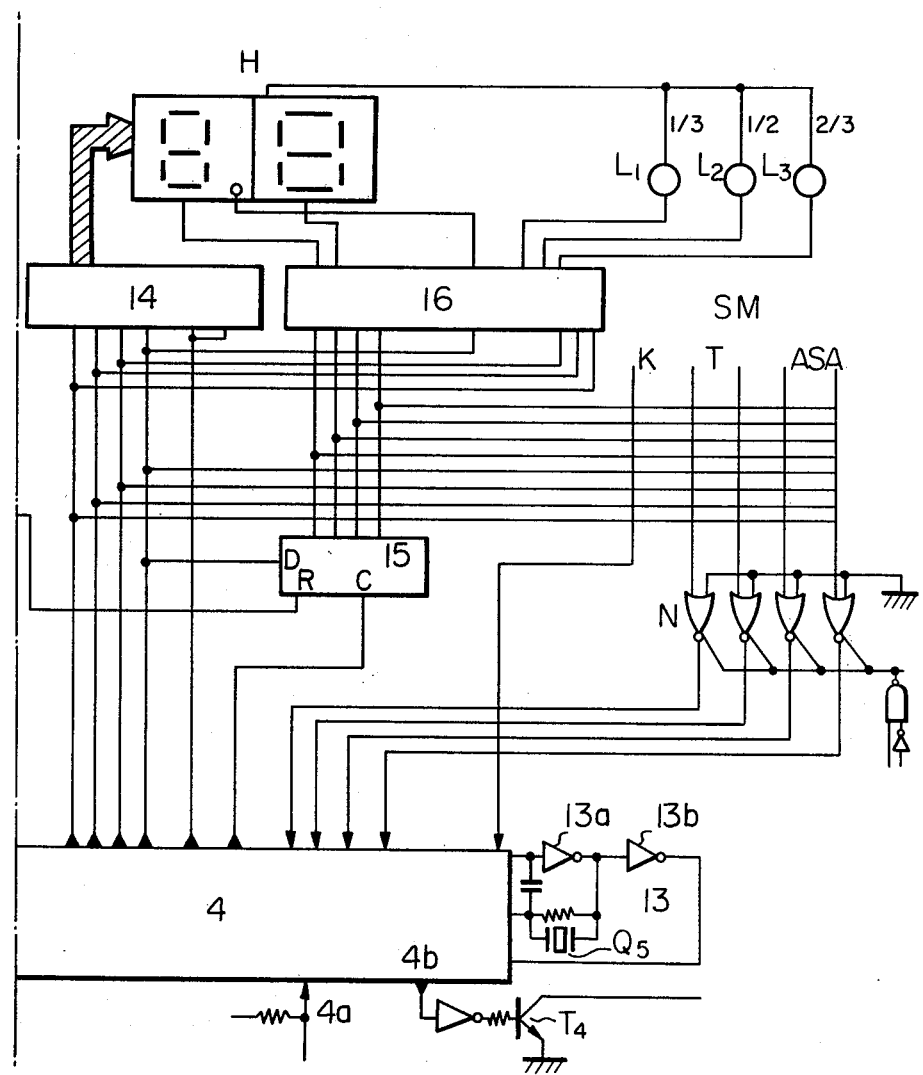
FIG. 7 is a block diagram showing the right-hand half of the electric circuit of the present invention.

FIGS. 6 and 7 show a further embodiment of the present invention in which FIG. 6 shows the left hand half of the circuit substantially similar to that of FIG. 1 for the measurement of light while FIG. 7 shows the right hand half of the circuit for indicating various exposure factors for the proper exposure to control a photographic device incorporated in the system of the present invention.

In FIG. 6, the light measuring circuit shown is similar to FIG. 1 except that the constant current circuit 7 is shown as consisting of transistors $T_2$ and $T_3$ with its emitter grounded through an analog switch $S_6$, with the cathode of the photoelectric element $PT_1$ being connected to the collector of the transistor $T_3$.

The reset input terminal R is connected to reset command terminal of the control circuit 4 to which an electric source V is connected and a remeasuring switch SW and a capacitor C are connected to the reset command terminal in parallel to each other with other terminals being grounded.

A 1 MHz oscillator 13 consisting of a quartz oscillator $Q_s$ of 1 MHz and integrated circuits 13a, 13b is connected to the control circuit 4. The oscillator 13 serves as a clock pulse generator for the timing of the entire system.

A synchronizing input terminal 4a is provided in the control circuit 4 for the synchronous operation of the system with the operation of an external device while a synchronizing output terminal 4b having an amplifying transistor $T_4$ connected thereto is provided in order to actuate an external device in synchronism with the operation of the present system.

Referring to FIG. 7, a switch matrix SM having a shutter speed input T, and a firm sensitivity input ASA is provided these inputs are manually set by switches such as push buttons in the control circuit 4, and are subjected to operation together with the result of the measurement of the intensity of the light as effected by the circuit shown in FIG. 6.

The result of the operation in the control circuit 4 is supplied to F value indicating elements H through seven segment decoder driver 14 so as to indicate the F value for the proper exposure of the photographic device.

Further, a shift register 15 is driven by an output of the control circuit 4 relating to the result of the operation therein, which controls the output of a digit driver 16 so as to control the order of the figure of the indicating elements H for the F value, while it drives fraction indicating lamps $L_1$, $L_2$ and $L_3$, the lamp $L_1$ indicating the fraction $\frac{1}{3}$ when energized, the lamp $L_2$ indicating the fraction $\frac{1}{2}$ when energized while the lamp $L_3$ indicates the fraction $\frac{2}{3}$ when energized.

The reset terminal R of shift register 15 is connected to the reset input terminal R of the shift register 5. The function switching input K is supplied to the control circuit 4 which is actuated by a rotary switch (not shown), for example.

The output of the comparator 2 is connected to one terminal of an OR circuit 3A, the other input terminal of which is connected to the shift output terminal $Q_1$ and the invertor circuit 6.

One input of the NAND circuit 3B is connected to the photo-triggering circuit G while the other input is connected to the control circuit 4 so as to receive a command therefrom. The outputs of the OR circuit 3A and the NAND circuit 3B are connected to the inputs of the OR circuit 3 the output of which is connected to the shift input terminal C of the shift register 5.

In operation, upon switching the power source of the system to the ON state to issue a discharging command from the control circuit 4, the capacitors $C_1$, $C_2$, $C_3$, - - - are discharged. Upon issuance of the succeeding command for the commencement of the light measuring, the switch $S_1$ is ON, the switches $S_2$, $S_3$, $S_4$, $S_5$ are rendered OFF so that the capacitor $C_1$ is charged by the electric source E through the photoelectric element $PT_1$.

The capacitors $C_2$, $C_3$, - - - are successively connected in parallel to the capacitor $C_1$ each time the voltage of the capacitor $C_1$ reaches the reference voltage $V_{REF1}$ of the comparator 2 as in the case of the embodiment of FIG. 1.

The control lead wire of the analogue switch $S_6$ for varying the current value of the constant current circuit 7 is common with the control lead wire of the switch $S_4$ and, therefore, when the switch $S_4$ is switched to the ON state during the integration period of the photoelectric current, i.e., when the capacitor $C_3$ is connected, the discharging current during the discharging period to be commenced upon switching of the switch $S_1$ to the OFF state is varied. When the integrating period is terminated, the switch $S_1$ is switched to the OFF state, so that the electric charges of the capacitor $C_1$ and the capacitors $C_2$, $C_3$, - - - connected in parallel to the capacitor $C_1$ are discharged through the current of the constant current circuit 7. The time period until the discharging of the capacitors is terminated by the comparator 1 comparing the reference voltage $V_{REF2}$ with the voltage of the capacitor $C_1$, is obtained by the time measuring counter in the control circuit 4 in terms of a digital value as in the case of FIG. 1, and is indicative of the quantity of the light received by the photoelectric element $PT_1$ during the integrating time. The average intensity of the light is obtained in the control circuit 4 by dividing the thusly obtained quantity of the light.

The exposure factor informations such as the shutter speed T, the film sensitivity ASA and the like are supplied to the control circuit 4 so that the necessary conditions such as F value for the proper exposure of the photographic device are calculated in the control circuit 4 and the F value indication and the fraction indication are given in the indicating elements H and the fraction indicating lamps $L_1$, $L_2$, $L_3$ by the output of the control circuit 4 through the segment decoder driver 14 and the digit driver 16. The segment decoder driver 14 may be a BCD latch decoder LED driver known in the art such as MC14511 and the like, which is adapted to drive the LED display having two figures. The digit driver 16 includes in general six driver circuits known in the art as LED drivers and the like each having a relatively high input impedance.

When an artificial light source such as a flash lamp and an electronic flash device is used, such as illumination is given to the photo-triggering circuit G so that the artificial light can also be measured by the present system for obtaining a proper exposure of the photographic device.

Remeasuring of the light can also be effected by closing the remeasuring switch SW.

When a signal is given to the external synchronizing input terminal 4a, the light measuring system is made ready for the measurement of the light, and, at the same time, a synchronizing output signal is issued from the external synchronizing output terminal 4b. Thus, an external artificial light source can be energized in synchronism with the input signal for the proper exposure of the photographic device, because the light thusly issued is received by the photo-triggering circuit G.

The present system may not only be incorporated in a photographic device but also it can be embodied as a unit of an exposure meter.

What is claimed as new and desired to be secured by Letters Patent of the United States is:

1. A light measuring apparatus for measuring the intensity of incident light, comprising:

photoelectric means coupled to said light for generating photoelectric current in dependence on the intensity of said incident light;

capacitor integrating means coupled to said photoelectric means for integrating for a predetermined time period the photoelectric current so as to produce an integrated electric charge in said capacitor integrating means which is proportional to the total quantity of said light incident to said photoelectric means for said predetermined time period;

a constant current source capable of generating current of at least one constant current level;

control means coupled to said capacitor integrator means and said constant current source for controlling the discharging/charging of the electric charge of said capacitor integrating means through said constant current circuit so as to vary the voltage of said capacitor integrating means;

said capacitor integrating means comprising a plurality of parallel connectable capacitors adapted to be successively connected in parallel to the previously connected capacitor under the control of said control means, and said control means comprising, shift register means coupled to each of said capacitors for controlling the charging/discharging of each of said capacitors, comparator means coupled to said capacitors and said shift register means for actuating said shift register means to connect a respective succeeding capacitor additionally in parallel to the previously connected capacitor each time the voltage of the respective previously parallel connected capacitors reaches a predetermined comparison voltage applied to said comparator means, and means for applying said predetermined comparison voltage to said comparator means.

2. A light measuring apparatus according to claim 1, further comprising:

said control means comprising:

means for coupling said parallel connected capacitors to said constant current source after said predetermined time period to discharge said capacitors at a constant current value through said constant current source, digital means for counting a time period in which said capacitors discharge through said constant current source to produce a count value proportional to the amount of said incident light.

3. A light measuring apparatus according to claim 2, further comprising:

said constant current source generating a fixed current at only said one constant current level.

4. A light measuring apparatus according to claim 2, further comprising:

said constant current source comprising, said constant current source coupled to said shift register means and generating current at a selected one of plural constant current levels in dependence on the state of said shift register means.

5. A light measuring apparatus according to claim 2, wherein said constant current circuit comprises means for generating current at any selected one of plural constant current levels.

6. A light measuring apparatus according to claim 1, wherein said photoelectric means comprises:

a junction type photoelectric element.

7. A light measuring apparatus according to claim 1, further comprising:

means for commencing said integrating of said photoelectric current by issuing an external triggering signal and simultaneously energizing an external light source by said external triggering signal so that the light emitted by said light source is received by said photoelectric element, thereby permitting the light emitted by said external light source to be simultaneously measured.

8. A light measuring apparatus according to claim 1 adapted to be connected to a photographic device, further comprising an operation circuit for introducing at least an exposure factor such as the film sensitivity, the shutter speed and the diaphragm aperture of an objective lens of said photographic device to said digitally indicated time value so as to modify the same depending upon said exposure factor, and indicating means for exhibiting informations thus obtained for the proper exposure.

* * * * *